United States Patent
Herman et al.

(10) Patent No.: US 10,286,848 B2
(45) Date of Patent: May 14, 2019

(54) STORAGE TRAY

(71) Applicant: Ford Global Technologies, LLC, Dearborn, MI (US)

(72) Inventors: Joseph Walter Herman, Detroit, MI (US); Craig West, Woodhaven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/706,402

(22) Filed: Sep. 15, 2017

(65) Prior Publication Data

US 2019/0084484 A1 Mar. 21, 2019

(51) Int. Cl.
| | |
|---|---|
| *B60R 7/04* | (2006.01) |
| *B60R 5/04* | (2006.01) |
| *B60R 7/02* | (2006.01) |
| *B60R 7/08* | (2006.01) |

(52) U.S. Cl.
CPC ............... *B60R 5/045* (2013.01); *B60R 7/02* (2013.01); *B60R 7/08* (2013.01)

(58) Field of Classification Search
CPC ........ A47B 96/021; B65D 2543/00629; B65D 2543/00685; B65D 2543/00796; B65H 2701/31; H01L 2924/00; H01L 2924/00014; H01L 2224/45144; H01L 2924/00015; H01L 2224/48463
USPC ...................................................... 296/37.16
See application file for complete search history.

(56) References Cited

U.S. PATENT DOCUMENTS

| | | | | |
|---|---|---|---|---|
| 3,195,745 | A * | 7/1965 | Cretsinger | B60P 7/08 296/37.8 |
| 5,669,537 | A * | 9/1997 | Saleem | B60R 5/045 224/42.32 |
| 5,685,592 | A * | 11/1997 | Heinz | B60N 3/10 224/925 |
| 6,113,172 | A | 9/2000 | Chaloult et al. | |
| 6,406,083 | B2 * | 6/2002 | Bharj | B60R 5/044 296/37.1 |
| 6,779,824 | B1 * | 8/2004 | Lazarevich | B60P 1/003 296/37.6 |
| 6,874,667 | B2 * | 4/2005 | Dykstra | B60R 5/04 224/275 |
| 7,188,881 | B1 * | 3/2007 | Sturt | B60R 5/041 296/26.09 |
| 8,256,819 | B1 * | 9/2012 | Gregory | B60R 9/065 296/37.6 |
| 8,714,613 | B1 * | 5/2014 | Gillis | B60R 7/04 296/24.34 |
| 9,073,488 | B1 * | 7/2015 | Stanczak | B60R 5/045 |
| 9,278,647 | B2 * | 3/2016 | Stanczak | B60R 5/045 |
| 9,376,147 | B2 * | 6/2016 | Craven | B62D 43/06 |
| 9,440,590 | B1 * | 9/2016 | Huelke | B60R 5/045 |
| 2002/0089203 | A1 * | 7/2002 | Flowerday | B60N 3/08 296/37.8 |

(Continued)

*Primary Examiner* — Kiran B Patel
(74) *Attorney, Agent, or Firm* — Vichit Chea; Price Heneveld LLP (57) ABSTRACT

A vehicle cargo area includes a retention structure having an upper portion, a vertical portion, an arcuate portion, and an angled portion. The vehicle cargo area further includes a storage tray having a coupling portion that removably couples to the retention structure by passing over the vertical portion and engages with the vertical portion such that the coupling portion is secured in the retention structure.

8 Claims, 12 Drawing Sheets

(56) References Cited

U.S. PATENT DOCUMENTS

| | | | |
|---|---|---|---|
| 2002/0089217 A1* | 7/2002 | Scheerhorn | B60R 7/04 297/188.19 |
| 2004/0124653 A1* | 7/2004 | Grafton | B60R 9/00 296/37.6 |
| 2006/0170234 A1* | 8/2006 | Cooley | B60P 1/003 296/26.09 |
| 2007/0065264 A1* | 3/2007 | Sturt | B60P 1/003 414/545 |
| 2008/0061576 A1* | 3/2008 | Hwang | B60R 5/04 296/37.5 |
| 2009/0033119 A1* | 2/2009 | Suzuki | B60R 5/04 296/37.14 |
| 2009/0127305 A1* | 5/2009 | Ropp | B60P 1/003 224/404 |
| 2010/0187857 A1* | 7/2010 | Fischer | B60R 5/04 296/184.1 |
| 2013/0009419 A1* | 1/2013 | Torres | B60R 5/044 296/24.45 |
| 2013/0193708 A1* | 8/2013 | Lucas | B60R 7/043 296/37.16 |
| 2014/0015271 A1* | 1/2014 | Demma | B60R 5/045 296/24.44 |
| 2014/0117695 A1* | 5/2014 | Murru | B60R 5/045 296/24.44 |
| 2014/0197657 A1* | 7/2014 | Gillis | B60R 7/04 296/37.8 |
| 2016/0090046 A1* | 3/2016 | Engerman | B60R 5/044 296/37.2 |
| 2016/0207467 A1* | 7/2016 | Parlow | B60R 5/044 |
| 2016/0344221 A1* | 11/2016 | Kramer | H02J 7/025 |
| 2018/0079366 A1* | 3/2018 | Lundberg | B60R 7/14 |
| 2018/0118118 A1* | 5/2018 | Herman | B60R 5/045 |
| 2018/0154836 A1* | 6/2018 | Herman | B60P 7/04 |
| 2018/0319305 A1* | 11/2018 | White | B60N 3/002 |

\* cited by examiner

STORAGE TRAY

FIELD OF THE DISCLOSURE

The present disclosure generally relates to a storage tray. More specifically, the present disclosure relates to a storage tray for a cargo area.

BACKGROUND OF THE INVENTION

Vehicles have been provided with various approaches to providing privacy, security, or additional storage in the vehicle. One such area is in a cargo area of the vehicle. These privacy, security, or storage implements are typically removable and/or retractable. The interface between the vehicle and these removable privacy, security, or storage implements often requires the actuation of clips or other active fastening arrangements. The installation or removal of the conventional privacy, security, or storage implements can be difficult and require multiple steps, which may frustrate a user. While some clipless privacy, security, or storage implements have been developed, these clipless implements can also be difficult to install or remove. Additionally, some clipless privacy, security, or storage implements utilize large retention structures in a trim panel that may negatively affect the appearance of the vehicle when the storage implement is not installed or in use. Accordingly, there is a desire for an improved clipless storage tray that is easier to install or remove.

SUMMARY OF THE INVENTION

According to a first aspect of the present disclosure, a vehicle cargo area includes a retention structure that includes an upper portion, a vertical portion, an arcuate portion, and an angled portion. The vehicle cargo area further includes a storage tray that includes a coupling portion that removably couples to the retention structure by passing over the vertical portion and engages with the vertical portion such that the coupling portion is secured in the retention structure.

Embodiments of the first aspect of the present disclosure can include any one or a combination of the following features:
  the retention structure further includes a horizontal portion;
  the vertical portion extends in a downward direction relative to the horizontal portion;
  the angled portion extends in a downward sloping direction from the vertical portion;
  the arcuate portion extends in an upward direction from the angled portion;
  the upper portion extends in an upward sloping direction from the arcuate portion, and wherein the upper portion is substantially parallel to the angled portion;
  a height difference between the horizontal portion and an upper extreme of the upper portion is about equal to a height of the vertical portion; and
  the storage tray couples to the retention structure such that unintentional decoupling of the storage tray is prevented in forward, rearward, and vertical directions.

According to a second aspect of the present disclosure, a vehicle cargo area includes a retention structure that includes an upper portion adjacent an arcuate portion, an angled portion adjacent the arcuate portion and opposite the upper portion, and a vertical portion adjacent the angled portion and opposite the arcuate portion. The vehicle cargo area further includes a storage tray that includes a coupling portion that removably couples to the retention structure such that unintentional decoupling from the retention structure is prevented in forward, rearward, and vertical directions.

Embodiments of the second aspect of the present disclosure can include any one or a combination of the following features:
  the retention structure is integrally formed in a trim panel;
  the vertical portion extends in a downward direction relative to a horizontal portion;
  the angled portion extends in a downward sloping direction from the vertical portion;
  the arcuate portion extends in an upward direction from the angled portion;
  the upper portion extends in an upward sloping direction from the arcuate portion, and wherein the upper portion is substantially parallel to the angled portion.

According to a third aspect of the present disclosure, a vehicle includes a trim panel positioned in a cargo area. The vehicle also includes a retention structure having an upper portion adjacent an arcuate portion, an angled portion adjacent the arcuate portion and opposite the upper portion, and a vertical portion adjacent the angled portion and opposite the arcuate portion, wherein the retention structure is integrally formed with the trim panel. The vehicle further includes a storage tray that includes a coupling portion that removably couples to the retention structure. The coupling portion includes a recessed portion and a sloped portion.

Embodiments of the third aspect of the present disclosure can include any one or a combination of the following features:
  the retention structure further includes horizontal portion;
  the vertical portion extends downwardly from a top surface of the horizontal portion by at least about 3 mm;
  the angled portion extends in a downward sloping direction from the vertical portion at angle of at least about 15 degrees;
  the arcuate portion extends in an upward direction from the angled portion; and
  the upper portion extends in an upward sloping direction from the arcuate portion, and wherein the upper portion is substantially parallel to the angled portion.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
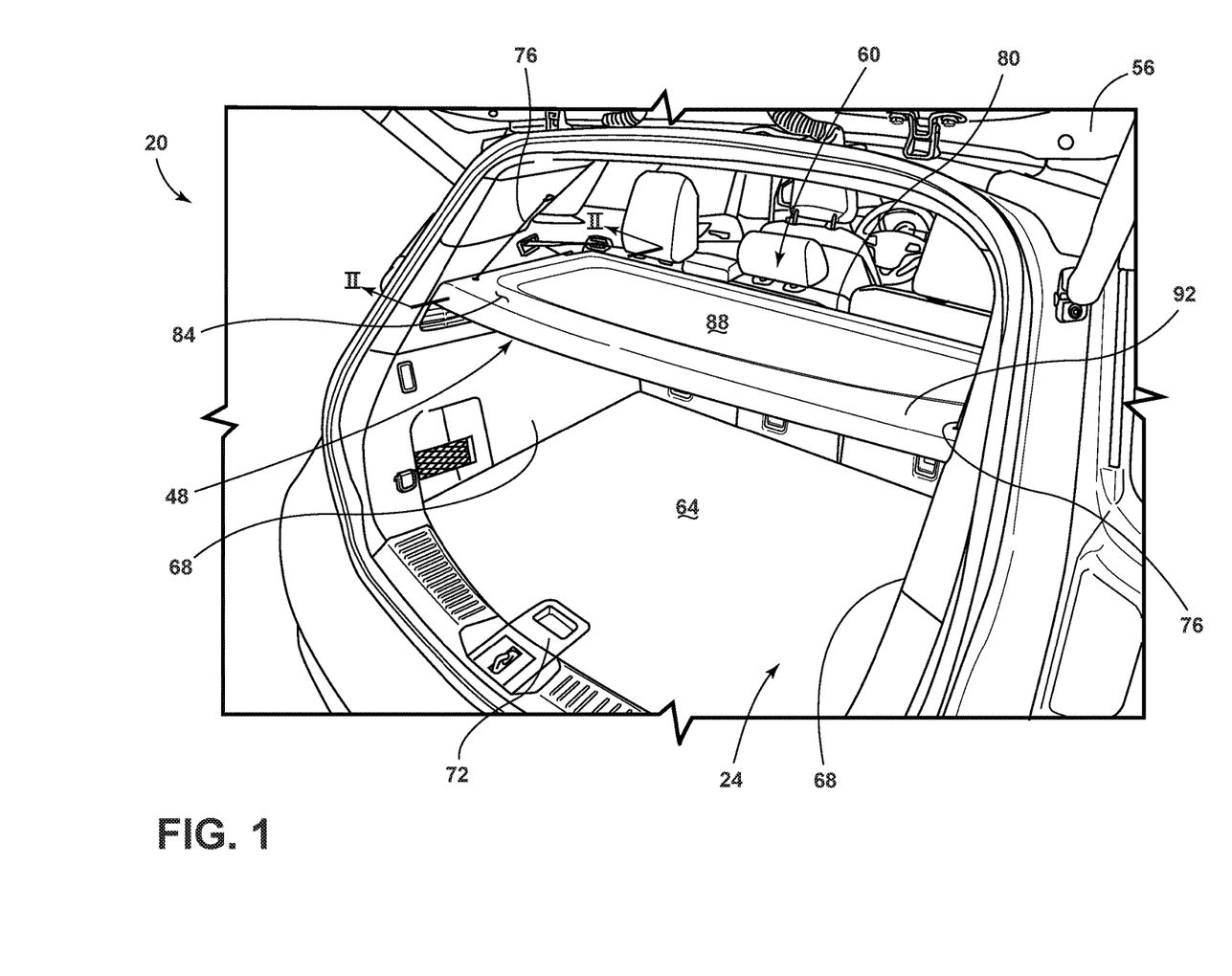
FIG. 1 is a rear perspective view of a cargo area of a vehicle.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a storage tray. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-11, reference numeral 20 generally designates a vehicle. The vehicle 20 is equipped with a cargo area 24. The cargo area 24 includes a retention structure 28. The retention structure 28 includes an upper portion 32, a vertical portion 36, an arcuate portion 40, and an angled portion 44. The cargo area 24 further includes a storage tray 48 that includes a coupling portion 52 that removably couples to the retention structure 28 by passing over the vertical portion 36 and engaging with the vertical portion 36 such that the coupling portion 52 is secured in the retention structure 28.

Referring again to FIG. 1, the vehicle 20 is shown with a tailgate 56 in an open position. With the tailgate 56 in the open position, the cargo area 24 is made accessible to a user. The cargo area 24 is positioned behind a rearward most row of seats 60. The cargo area 24 may include a floor panel 64, one or more trim panels 68, and the storage tray 48. The floor panel 64 may be removed by actuation of a floor handle 72 that permits access to additional storage below the floor panel 64 (e.g., spare tire, additional compartments, etc.). The storage tray 48 may be equipped with one or more suspension members 76 that extend in an upward direction to provide additional support to the storage tray 48. The suspension members 76 are shown as operably coupled to the trim panel 68 on either side of the cargo area 24. However, it is contemplated that it may be beneficial to couple the suspension members 76 to the tailgate 56 such that opening the tailgate 56 results in an upward rotation of the storage tray 48 about a rotational axis or pivot point that is located near a vehicle-forward end 80 of the storage tray 48. The vehicle-forward end 80 of the storage tray 48 is positioned proximal the rearward most row of seats 60. A top surface 84 of the storage tray 48 may be equipped with a depressed region 88 that is surrounded by a raised region 92 of the storage tray 48. The transition from the depressed region 88 to the raised region 92 of the storage tray 48 may be generally vertical, substantially vertical, sloped, angled, and/or arcuate. The depressed region 88 may aid in retention of a cargo item stored thereon during vehicle maneuvers.

Figure 2:
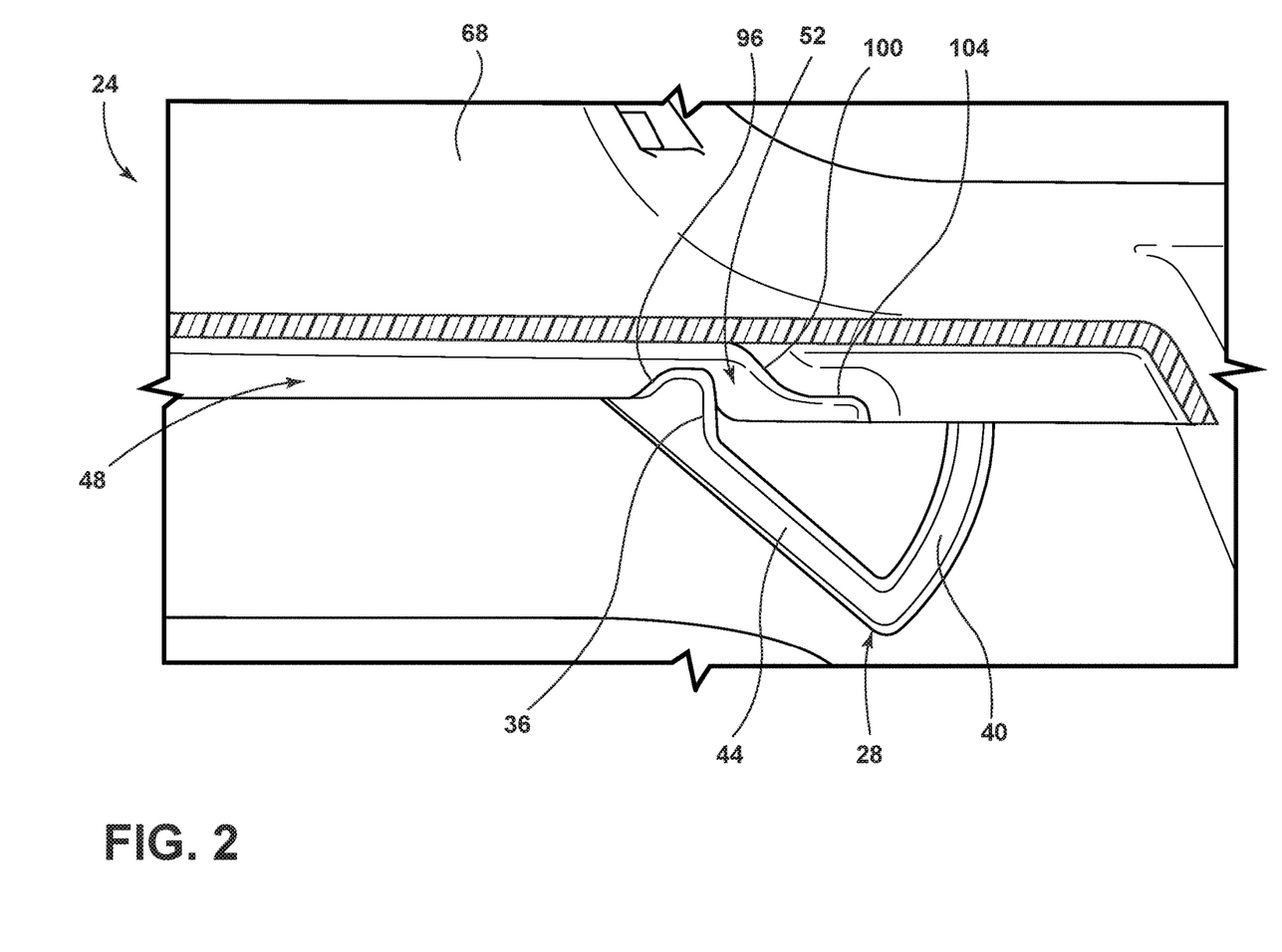
FIG. 2 is a cross-sectional view of a storage tray engaged with a retention structure, taken along line II-II of FIG. 1, according to a first embodiment.
Figure 3:
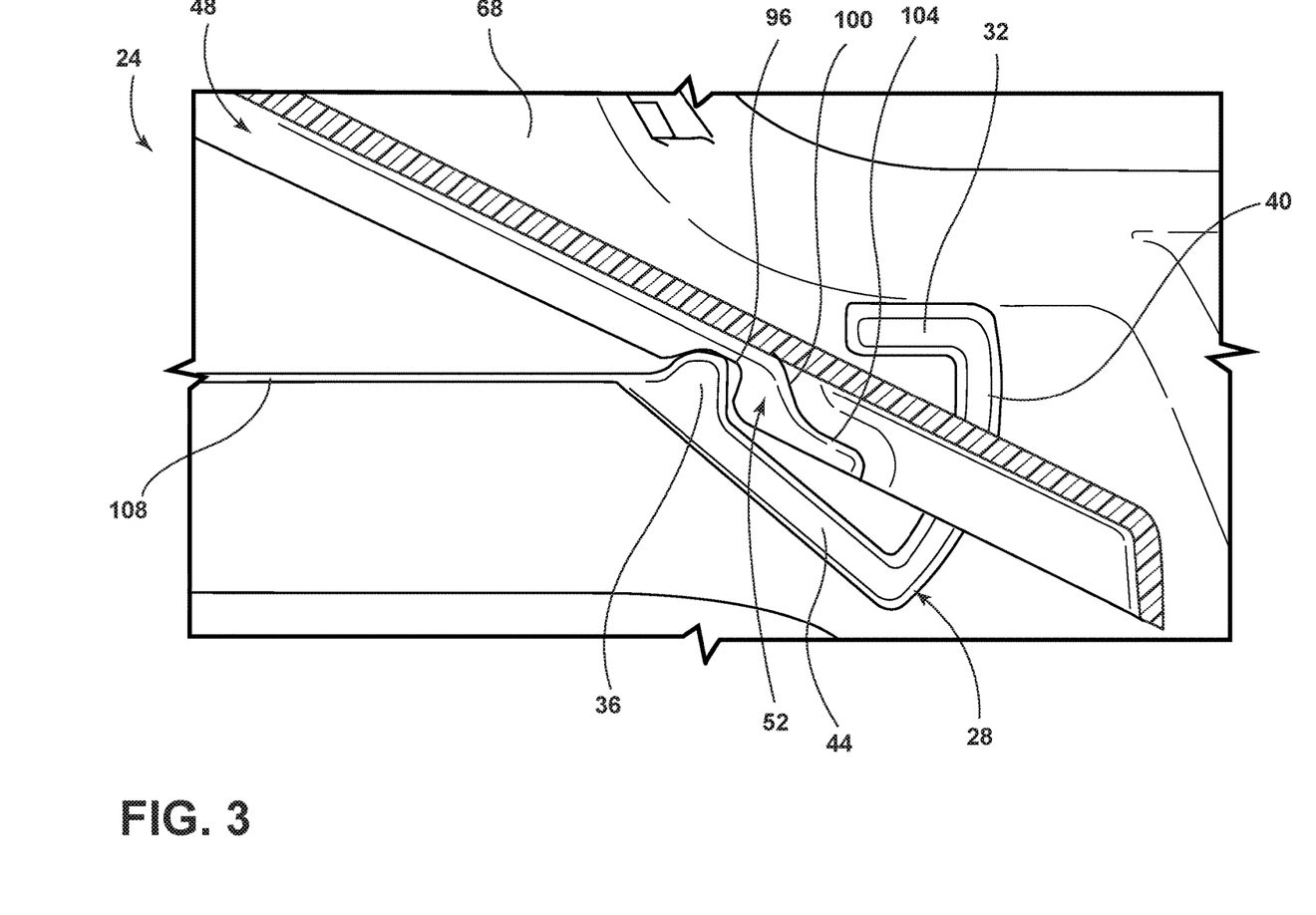
FIG. 3 is a cross-sectional view of the storage tray engaged with the retention structure, taken along line II-II of FIG. 1, with the storage tray in an upwardly rotated position, according to the first embodiment.
Figure 4:
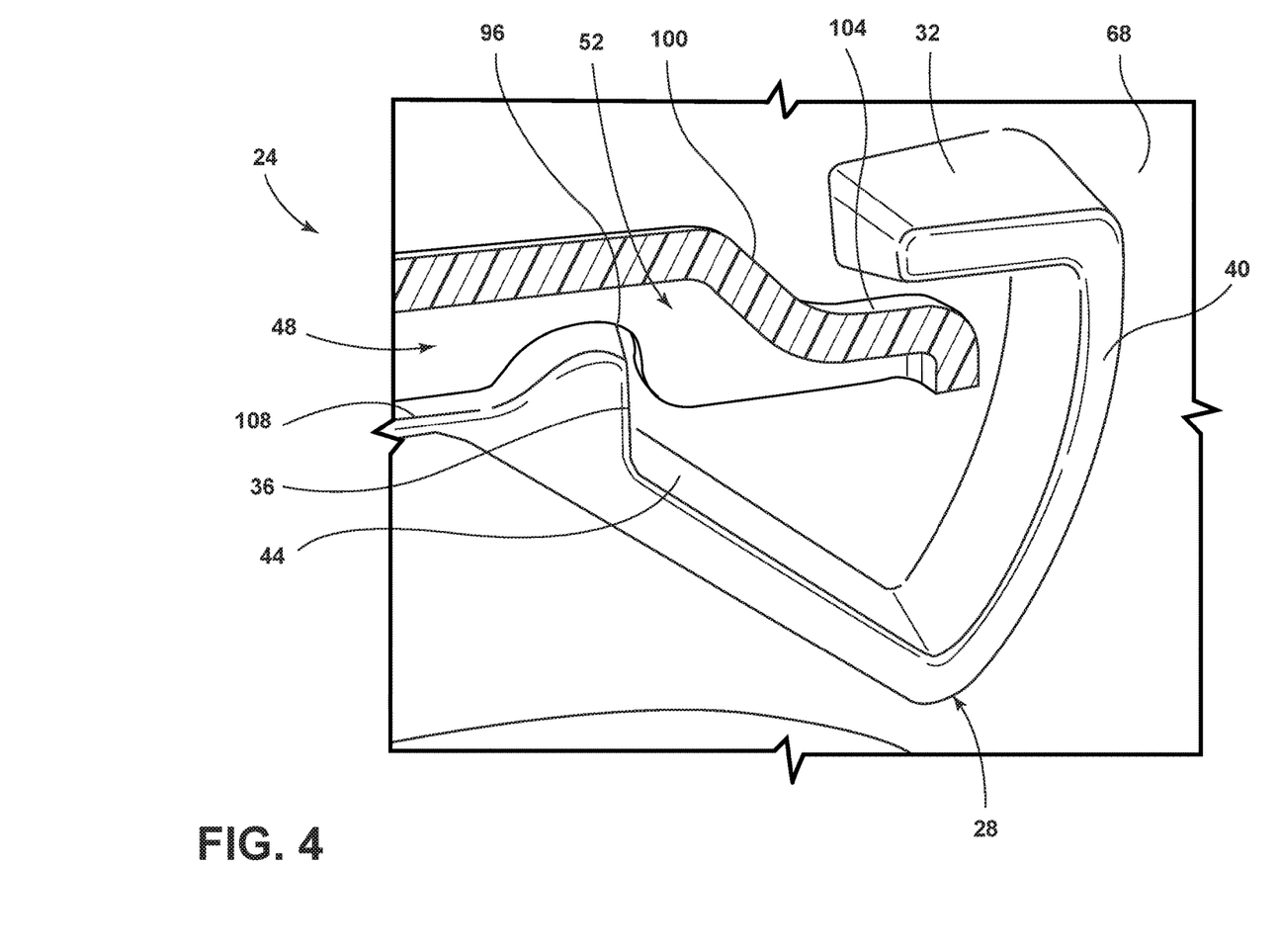
FIG. 4 is an enlarged perspective view of the engagement between the storage tray and the retention structure, according to the first embodiment.

Referring now to FIGS. 2-4, the engagement between the retention structure 28 and the storage tray 48 is shown according to one embodiment. The coupling portion 52 of the storage tray 48 engages with the retention structure 28. The coupling portion 52 includes a recessed portion 96, a sloped portion 100, and a planar portion 104. The retention structure 28 includes the upper portion 32, the vertical portion 36, the arcuate portion 40, and the angled portion 44. The upper portion 32 is adjacent to the arcuate portion 40. The angled portion 44 is adjacent to the arcuate portion 40 and opposite the upper portion 32. The vertical portion 36 is adjacent to the angled portion 44 and is opposite the arcuate portion 40. The retention structure 28 may be formed as a separate piece that is coupled to the trim panel 68 during assembly by the manufacturer or as an add-on piece installed by a dealer or end-user. Alternatively, the retention structure 28 may be integrally formed with the trim panel 68. The recessed portion 96 of the coupling portion 52 engages with the vertical portion 36 to prevent unintentional decoupling of the storage tray 48 from the retention structure 28 in forward and/or rearward directions. The vertical portion 36 may extend vertically upward of an upper extreme of a horizontal portion 108 of the retention structure 28.

Referring again to FIGS. 2-4, the upper portion 32 of the retention structure 28 is configured to prevent the coupling portion 52 of the storage tray 48 from unintentionally decoupling from the retention structure 28 in a vertical direction. For example, if the vehicle 20 experiences an obstacle in the road (e.g., speed bump, pothole, etc.) the planar portion 104 of the coupling portion 52 may contact the upper portion 32 of the retention structure 28 such that the coupling portion 52 remains operably coupled with the retention structure 28. The vertical portion 36 of the retention structure 28 is configured to engage with the recessed portion 96 of the coupling portion 52 to prevent the coupling portion 52 from unintentionally decoupling from the retention structure 28 in a vehicle rearward and/or vehicle forward direction (e.g., during acceleration or braking). The arcuate portion 40 provides a forward stop for the coupling portion 52 that may aid in the positioning of the coupling portion 52 in the retention structure 28. The arcuate portion 40 is configured to prevent unintentional decoupling of the coupling portion 52 from the retention structure 28 in the vehicle forward direction. The arcuate portion 40 is further configured to permit rotational or pivotal motion of the coupling portion 52 within the retention structure 28 about a pivot point that may be defined by the vertical portion 36. The angled portion 44 may provide a rotational stop in downward direction from the vertical portion 36 that prevents excessive rotation of the coupling portion 52 within the retention structure 28, which may lead to unintentional decoupling of the storage tray 48 from the retention structure 28. The upper portion 32, the vertical portion 36, the arcuate portion 40, and the angled portion 44 define an enclosure of the retention structure 28 that encourages proper coupling of the storage tray 48 to the retention structure 28 while also preventing unintentional decoupling of the storage tray 48 from the retention structure 28. Said another way, the retention structure 28 is configured to provide physical interferences and/or impediments to the decoupling of the storage tray 48 from the retention structure 28 such that unintentional decoupling of the storage tray 48 is prevented in forward, rearward, vertical, and/or rotational directions.

Referring further to FIGS. 2-4, the horizontal portion 108 may extend vehicle rearward of the vertical portion 36. The recessed portion 96 of the coupling portion 52 may be asymmetrical as shown to improve the ease with which a user can insert the coupling portion 52 into the retention structure 28 while maintaining good retention of the storage tray 48. The sloped portion 100 of the coupling portion 52 provides greater clearance between the upper portion 32 of the retention structure 28 and the coupling portion 52 of the storage tray 48 when the storage tray 48 is being installed and/or removed from the cargo area 24. The sloped portion 100 may additionally aid in the retention of the storage tray 48 within the retention structure 28 in forward, rearward, and/or vertical directions. The planar portion 104 of the coupling portion 52 is configured to engage with an underside of the upper portion 32 of the retention structure 28 such that vertical motion of the storage tray 48 is prevented by the interference between the planar portion 104 and the upper portion 32. In the embodiment shown, installation and/or removal of the storage tray 48 is accomplished by rotating or pivoting the storage tray 48 to an angled position (FIG. 3) and inserting the coupling portion 52 into the retention structure 28. For installation, the storage tray 48 can then be rotated or pivoted in a downward direction such that the storage tray 48 rests on the horizontal portion 108. For removal, the storage tray 48 can be lifted over the vertical portion 36 while in the angled position or pulled such that the coupling portion 52 slides along the vertical portion 36. The horizontal portion 108 may provide additional support to the storage tray 48 for cargo items that are stored upon the storage tray 48 and/or aid in the positioning of the coupling portion 52 within the retention structure 28. Further, the horizontal portion 108 may aid in preventing unintentional decoupling of the storage tray 48 from the retention structure 28.

Figure 5:
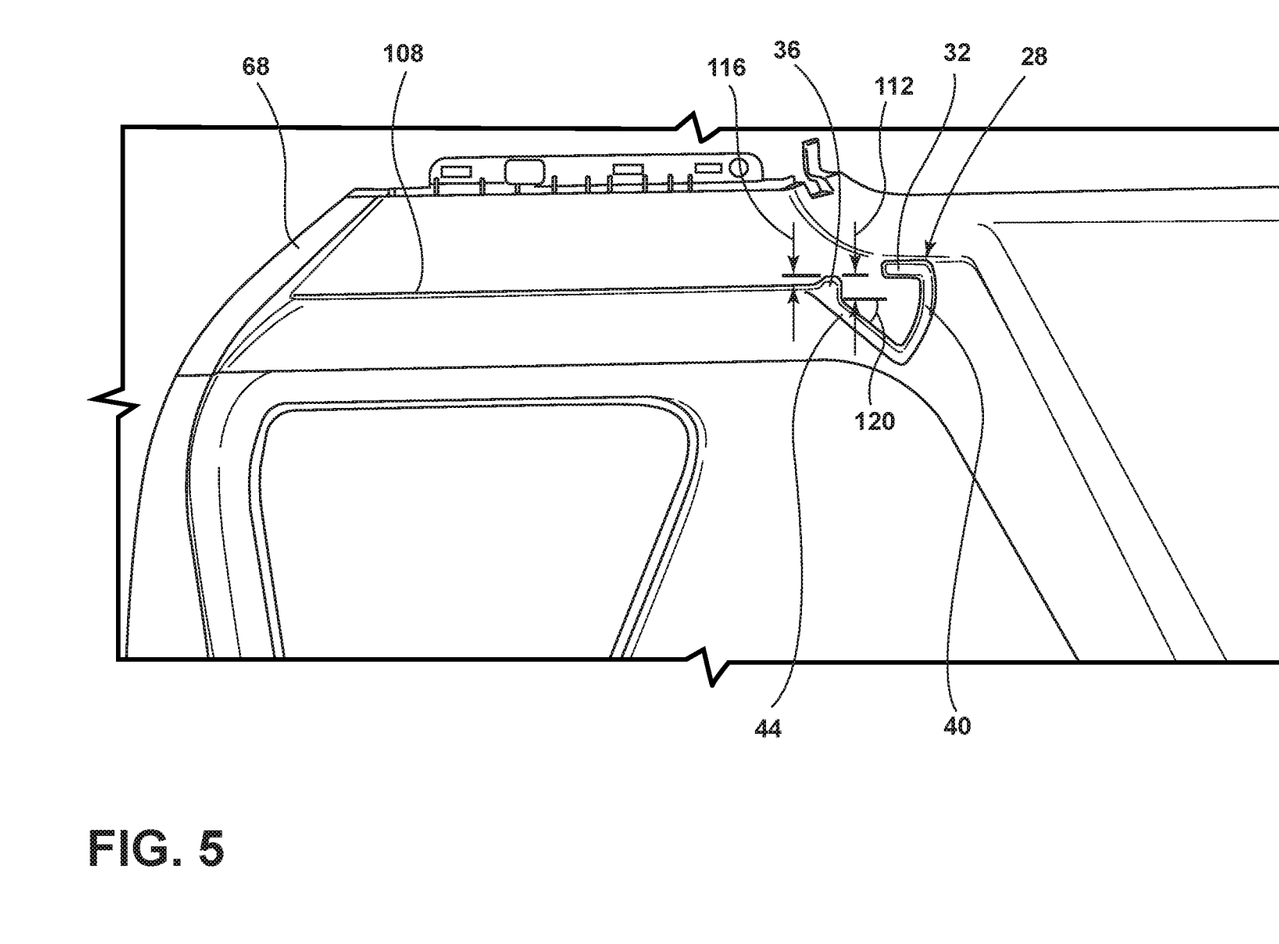
FIG. 5 is a side view of a trim panel equipped with the retention structure, according to the first embodiment.
Figure 6:
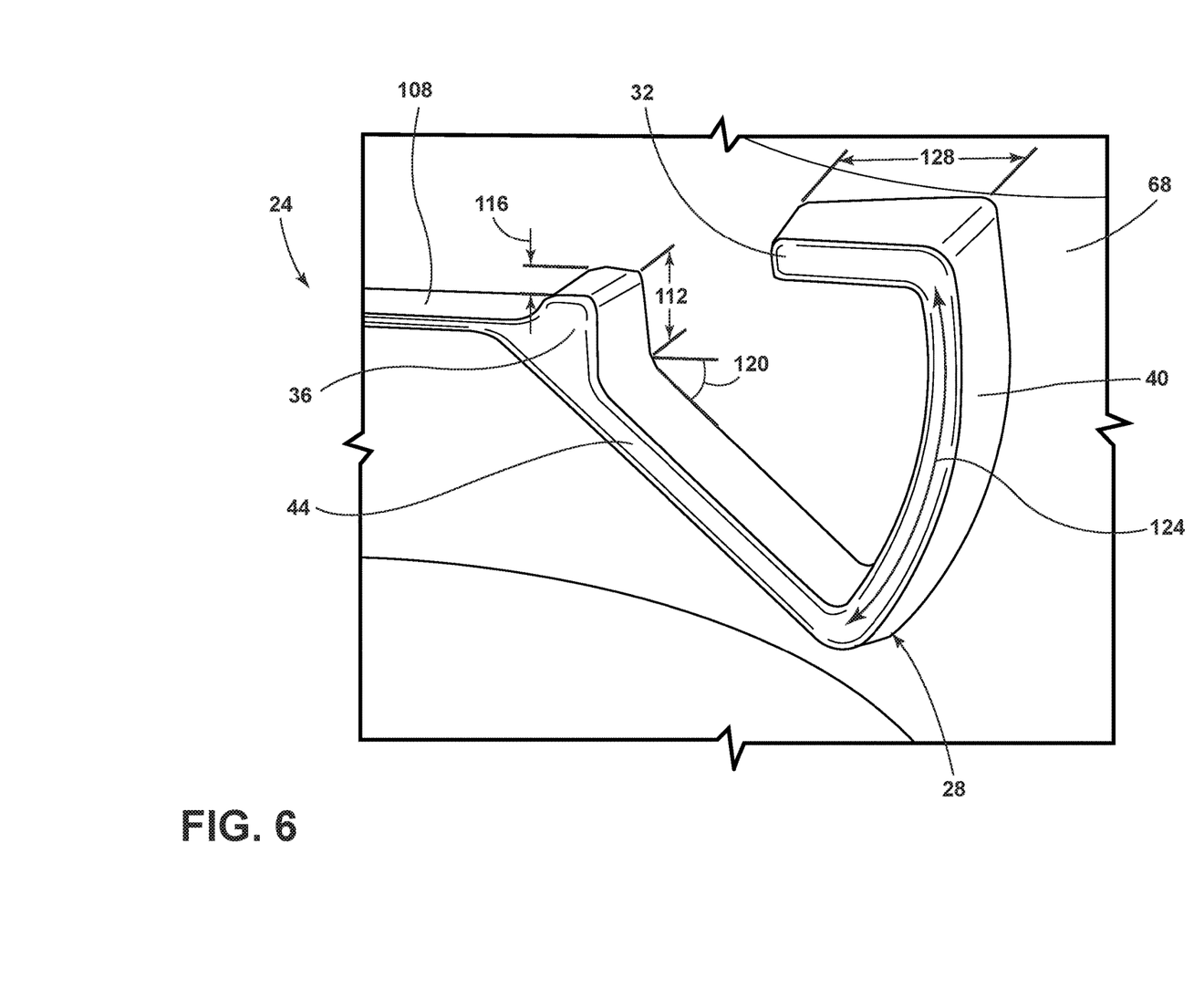
FIG. 6 is an enlarged view of the retention structure, according to the first embodiment.

Referring to FIGS. 5 and 6, the retention structure 28 is shown as integrally formed in the trim panel 68. The horizontal portion 108 of the retention structure 28 may extend from the vertical portion 36 rearward to a position on the trim panel 68 that corresponds with a rearward most region of the trim panel 68 that is not engaged by the tailgate 56 when the tailgate 56 is in a closed position. It is contemplated that the rearward most portion of the horizontal portion 108 may alternatively be spaced apart from the rearward most portion of the trim panel 68 that is contacted by the tailgate 56 when the tailgate 56 is in the closed position to improve an ease of manufacture such that a gap exists between the tailgate 56 and the horizontal portion 108. In such an embodiment, the gap between the tailgate 56 and the horizontal portion 108 may be filled by the storage tray 48 to prevent cargo items from rolling off the storage tray 48 during vehicle maneuvers. The storage tray 48 may be made from a flexible material such that contact between the tailgate 56 and the storage tray 48 when the tailgate 56 is placed in the closed position may slightly deform the storage tray 48 to an extent that it is not detrimental to the functionality of the storage tray 48. Additionally, the slight deformation of the storage tray 48 may improve retention of the storage tray 48 on the retention structure 28 and further reduce any buzzing or rattling sounds that may arise from an improper fit between the storage tray 48 and the retention structure 28.

Referring again to FIGS. 5 and 6, the vertical portion 36 of the retention structure 28 may have an overall height 112 of at least about 2 mm, at least about 3 mm, at least about 4 mm, at least about 5 mm, at least about 6 mm, at least about 7 mm, at least about 8 mm, at least about 9 mm, at least about 10 mm, less than about 20 mm, less than about 19 mm, less than about 18 mm, less than about 17 mm, less than about 16 mm, less than about 15 mm, less than about 14 mm, less than about 13 mm, less than about 12 mm, less than about 11 mm, less than about 10 mm, and/or combinations or ranges thereof. The vertical portion 36 may extend vertically above the horizontal portion 108 to a height above the horizontal portion 116 that is at least about 1 mm, at least about 2 mm, at least about 3 mm, at least about 4 mm, at least about 5 mm, less than about 10 mm, less than about 9 mm, less than about 8 mm, less than about 7 mm, less than about 6 mm, and/or combinations or ranges thereof. The angled portion 44 of the retention structure 28 may extend in a downward direction from the vertical portion 36 at an angle 120 of at least about 5 degrees, at least about 10 degrees, at least about 15 degrees, at least about 20 degrees, at least about 25 degrees, at least about 30 degrees, at least about 35 degrees, at least about 40 degrees, at least about 45 degrees, less than about 50 degrees, less than about 45 degrees, less than about 40 degrees, less than about 35 degrees, less than about 30 degrees, less than about 25 degrees, less than about 20 degrees, less than about 15 degrees, less than about 10 degrees, and/or combinations, ranges, or intermediate values thereof. The angle 120 is measured from a horizontal plane such as that defined by the horizontal portion 108.

Referring further to FIGS. 5 and 6, the arcuate portion 40 of the retention structure 28 may have an arc 124 that corresponds to a circle having a radius of at least about 60 mm, at least about 70 mm, less than about 80 mm, less than about 90 mm, and/or combinations and ranges thereof, including intermediate values. Alternatively the arcuate portion 40 of the retention structure 28 may be a continuous curve that may not be defined by a circle having a single radius. That is, the arcuate portion 40 of the retention structure 40 may be a continuous curve that is defined by a circle having a radius that is continuously changing. The upper portion 32 of the retention structure 28 may have a length 128 that extends from the arcuate portion 40 toward the vertical portion 36 of at least about 2 mm, at least about 4 mm, at least about 6 mm, at least about 8 mm, at least about 10 mm, at least about 12 mm, at least about 14 mm, at least about 16 mm, less than about 30 mm, less than about 28 mm, less than about 26 mm, less than about 24 mm, less than about 22 mm, less than about 20 mm, less than about 18 mm, less than about 16 mm, and/or combinations or ranges thereof, including intermediate values.

Figure 7:
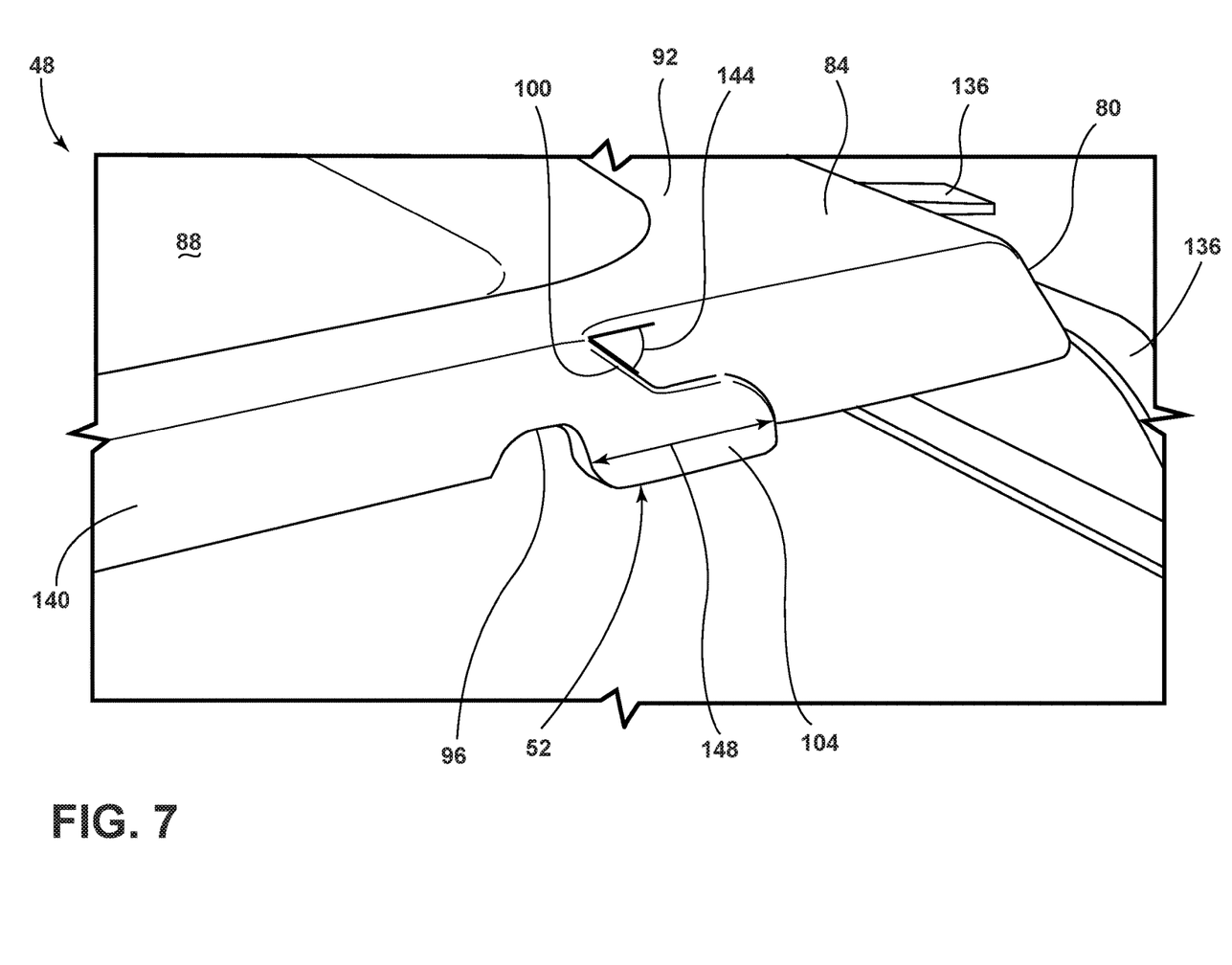
FIG. 7 is a side perspective view of a coupling portion of the storage tray, according to the first embodiment.

Referring now to FIG. 7, the storage tray 48 may further include a seatback-engagement portion 132 that may be pivotable relative to the storage tray 48. The pivotable motion of the seatback-engagement portion 132 relative to the storage tray 48 may be accomplished, for example, by a living hinge that is designed into the storage tray 48. The storage tray 48 may additionally include an upper stop 136 that limits the amount of upward rotation of the seatback-engagement portion 132. The seatback-engagement portion 132 may actively engage with the rearward most row of seats 60 (e.g., a rearward surface of the seatback). For example, the seatback-engagement portion 132 may be rotatable about a living hinge that is supported by a resilient mechanism (e.g., one or more spring mechanisms) that allows the seatback-engagement portion 132 to actively engage with the rearward most row of seats 60 regardless of the angular or longitudinal positioning of the rearward most row of seats 60 such that the cargo area 24 remains covered by the storage tray 48. The vehicle-forward end 80 of the storage tray 48 may be sloped or generally angled so as not to interfere with the rotation or range of motion of the seatback-engagement portion 132. The coupling portion 52 may be positioned vehicle rearward of the vehicle-forward end 80 of the storage tray 48. For example, the coupling portion 52 may be positioned to generally coincide with the depressed region 88, the raised region 92, and/or the transitional region between the depressed region 88 and the raised region 92. The region of the storage tray 48 that is between the coupling portion 52 and the vehicle-forward end 80 is recessed relative to a side edge 140 of the storage tray 48. The recess that exists between the coupling portion 52 and the vehicle-forward end 80 is positioned to prevent physical contact or interference that may otherwise occur between the storage tray 48 and the retention structure 28. Said another way, the recessed region between the coupling portion 52 and the vehicle-forward end 80 accommodates the protrusion of the retention structure 28 outward from the trim panel 68 into the cargo area 24 and allows the coupling portion 52 to engage with the retention structure 28 without unintended physical interference between the storage tray 48 and the retention structure 28.

Referring again to FIG. 7, the recessed portion 96 may have a depth that is at least about 1 mm, at least about 2 mm, at least about 3 mm, at least about 4 mm, at least about 5 mm, less than about 10 mm, less than about 9 mm, less than about 8 mm, less than about 7 mm, less than about 6 mm, and/or combinations or ranges thereof. The depth of the recessed portion 96 may be measured from a bottom of the planar portion 104. Alternatively, the depth of the recessed portion 96 may be measured from a bottom of the side edge 140. The sloped portion 100 of the coupling portion 52 is provided at an angle that allows or does not interfere with the pivotable motion of the storage tray 48 within the retention structure 28 (see FIG. 3). For example, the sloped portion 100 of the coupling portion 52 may slope in a downward direction from the top surface 84 of the storage tray 48 at an angle 144 of at least about 5 degrees, at least about 10 degrees, at least about 15 degrees, at least about 20 degrees, less than about 25 degrees, less than about 30 degrees, less than about 35 degrees, less than about 40 degrees, less than about 45 degrees, and/or combinations or ranges thereof. The planar portion 104 of the coupling portion 52 has an overall length 148 that extends from the recessed portion 96 forward to the forward most extreme of the coupling portion 52. The overall length 148 of the planar portion 104 of the coupling portion 52 may be at least about 5 mm, at least about 10 mm, at least about 15 mm, at least about 20 mm, at least about 25 mm, at least about 30 mm, less than about 35 mm, less than about 40 mm, less than about 45 mm, less than about 50 mm, and/or combinations or ranges thereof (including intermediate values).

Figure 8:
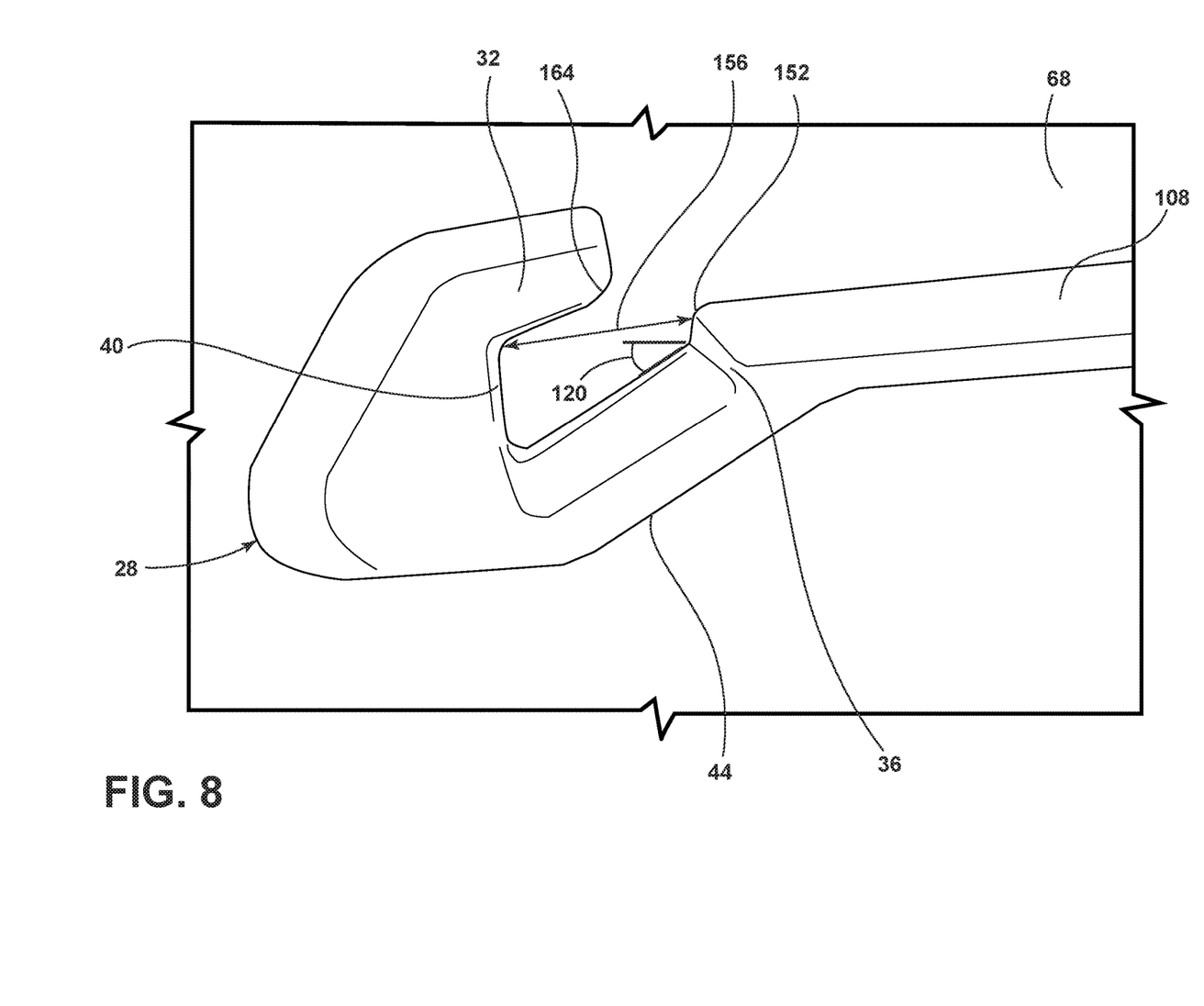
FIG. 8 is a side perspective view of the retention structure, according to a second embodiment.
Figure 9:
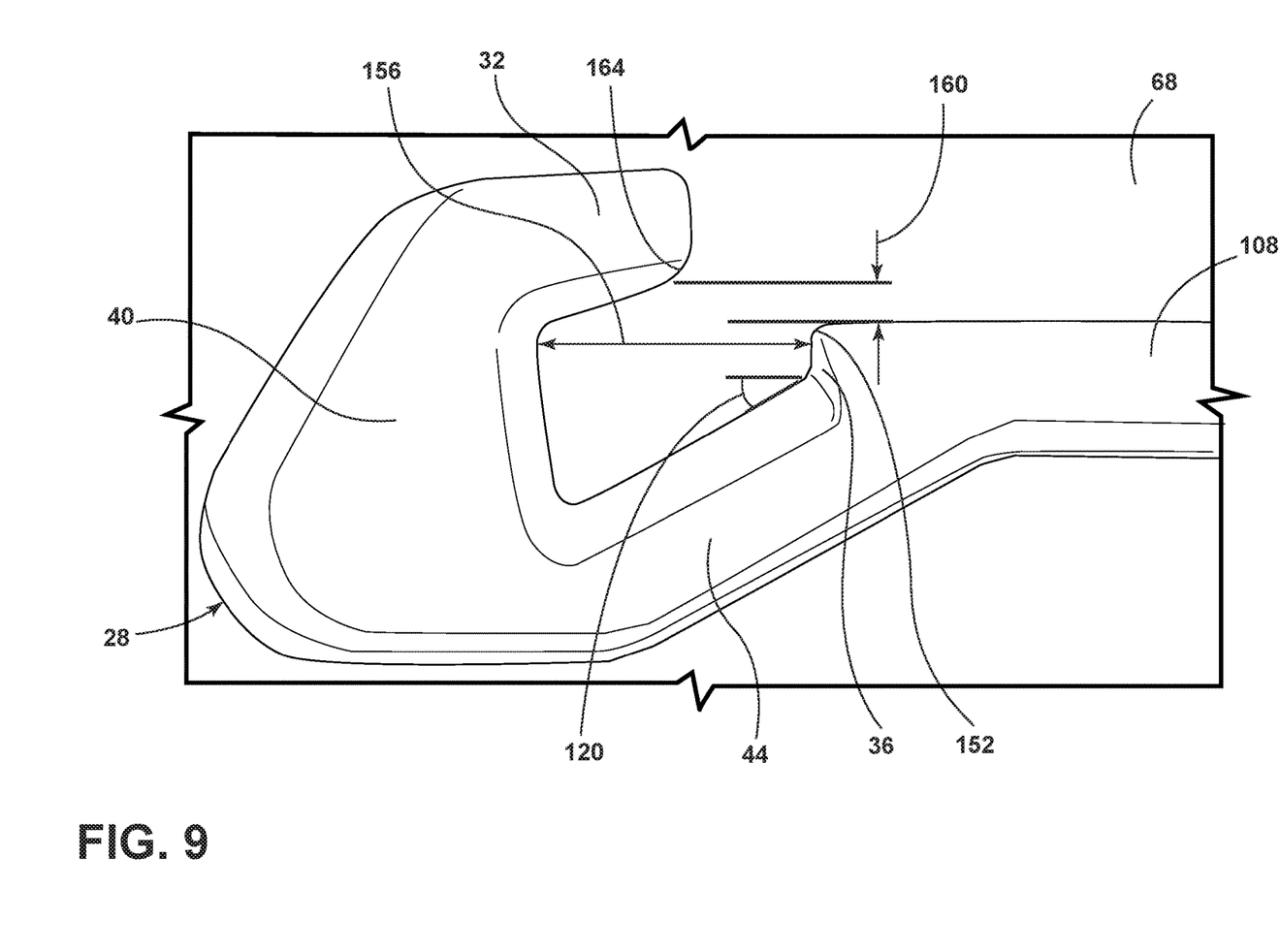
FIG. 9 is an enlarged side view of the retention structure of FIG. 8.

Referring to FIGS. 8 and 9, an alternative embodiment of the retention structure 28 is shown. The retention structure 28 includes the upper portion 32, the vertical portion 36, the arcuate portion 40, and the angled portion 44. The retention structure 28 may further include the horizontal portion 108. In the depicted embodiment, the vertical portion 36 does not extend vertically above the horizontal portion 108. The upper portion 32 is adjacent to the arcuate portion 40 and opposite from the angled portion 44. The angled portion 44 is adjacent to the arcuate portion 40 and is opposite the upper portion 32. The vertical portion 36 is adjacent to the angled portion 44 and opposite the arcuate portion 40. As with the previously discussed embodiment of the retention structure 28, the retention structure 28 may be integrally formed with the trim panel 68. Alternatively, the retention structure 28 may be a separate piece from the trim panel 68 that may be assembled by the manufacturer or installed by a dealer. The angles and dimensions described for the previous embodiment of the retention structure 28 may apply in part or in whole to the embodiment depicted in FIGS. 8 and 9.

Referring again to FIGS. 8 and 9, the transition between the horizontal portion 108 to the vertical portion 36 may be a sharp transition (e.g., about 90 degree turn) or the transition may be rounded. In embodiments where the transition is rounded, the transition may be defined by a first transitional arc 152. The first transitional arc 152 may be defined by a circle having a particular radius, such as a radius of about 1.00 mm, about 1.25 mm, about 1.50 mm, about 1.75 mm, about 2.00 mm, about 2.25 mm, about 2.50 mm, about 2.75 mm, about 3.00 mm, about 3.25 mm, about 3.50 mm, about 3.75 mm, about 4.00 mm, and/or combinations or ranges thereof (including intermediate values). The angled portion 44 extends from the vertical portion 36 in a downward sloping direction at the angle 120. The angle 120 is measured from a horizontal plane, such as that defined by the horizontal portion 108. The angle 120 may be, for example, at least about 20 degrees, at least about 25 degrees, at least about 30 degrees, at least about 35 degrees, less than about 40 degrees, less than about 45 degrees, less than about 50 degrees, and/or combinations or ranges thereof (including intermediate values). More specifically, the angle 120 may be, for example, about 29.0 degrees, about 29.1 degrees, about 29.2 degrees, about 29.3 degrees, about 29.4 degrees, about 29.5 degrees, about 29.6 degrees, about 29.7 degrees, about 29.8 degrees, about 29.9 degrees, about 30.0 degrees, about 30.1 degrees, about 30.2 degrees, about 30.3 degrees, about 30.4 degrees, about 30.5 degrees, about 30.6 degrees, about 30.7 degrees, about 30.8 degrees, about 30.9 degrees, about 40.0 degrees, and/or combinations or ranges thereof. A distance 156 between the vertical portion 36 and the arcuate portion 40 may be at least about 25 mm, at least about 26 mm, at least about 27 mm, at least about 28 mm, at least about 29 mm, at least about 30 mm, at least about 31 mm, at least about 32 mm, less than about 33 mm, less than about 34 mm, less than about 35 mm, less than about 36 mm, less than about 37 mm, less than about 38 mm, less than about 39 mm, less than about 40 mm, and/or combinations or ranges thereof.

Referring further to FIGS. 8 and 9, the top surface of the horizontal portion 108 may be approximately level with an uppermost portion of the arcuate portion 40. A gap 160 between the horizontal portion 108 and the upper portion 32 may be at least about 1 mm, at least about 3 mm, at least about 5 mm, at least about 7 mm, at least about 9 mm, less than about 11 mm, less than about 13 mm, less than about 15 mm, and/or combinations or ranges thereof. The upper portion 32 may include a second transitional arc 164 of the retention structure 28. The second transitional arc 164 may be defined as an arc that is associated with a circle having a particular radius, such as, a radius of at least about 4.5 mm, at least about 4.6 mm, at least about 4.7 mm, at least about 4.8 mm, at least about 4.9 mm, at least about 5.0 mm, at least about 5.1 mm, at least about 5.2 mm, at least about 5.3 mm, at least about 5.4 mm, at least about 5.5 mm, less than about 5.6 mm, less than about 5.7 mm, less than about 5.8 mm, less than about 5.9 mm, less than about 6.0 mm, less than about 6.1 mm, less than about 6.2 mm, less than about 6.3 mm, less than about 6.4 mm, less than about 6.5 mm, and/or combinations or ranges thereof.

Figure 10:
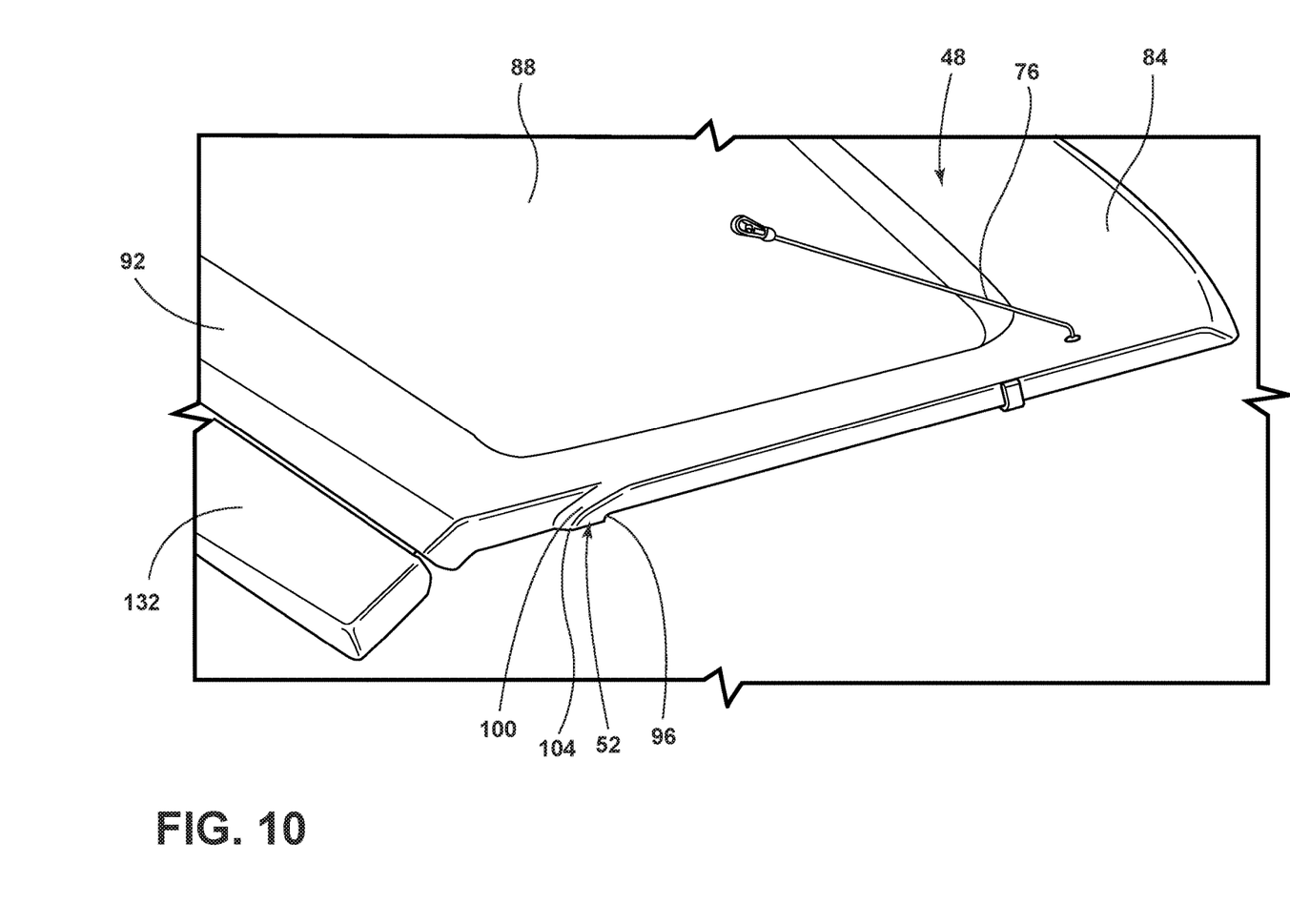
FIG. 10 is a top perspective view of the storage tray, according to the second embodiment.
Figure 11:
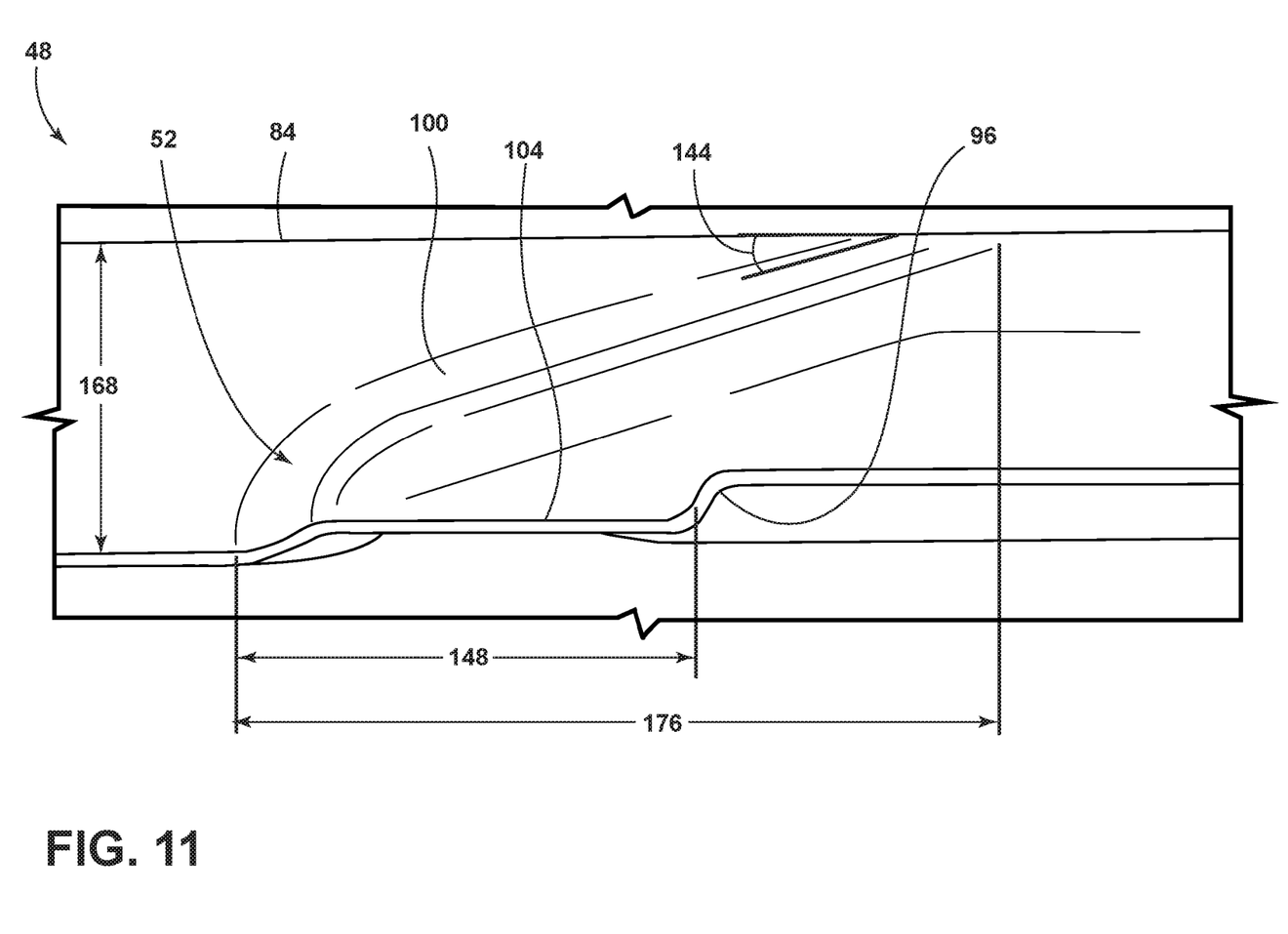
FIG. 11 is a side view of the coupling portion, according to the second embodiment.

Referring now to FIGS. 10 and 11, the storage tray 48 and the coupling portion 52 are shown according to another embodiment. The storage tray 48 includes the suspension member 76, the depressed region 88, the raised region 92, and the seatback-engagement portion 132. The storage tray 48 depicted here may include the features described above for the previous embodiment in whole or in part. The coupling portion 52 includes the recessed portion 96, the sloped portion 100, and the planar portion 104. The sloped portion 100 in the present embodiment extends to the end of the planar portion 104, whereas in the previous embodiment, the sloped portion 100 did not extend to the end of the planar portion 104. An overall thickness 168 of the storage tray 48 may be at least about 20 mm, at least about 25 mm, at least about 30 mm, at least about 35 mm, at least about 40 mm, less than about 45 mm, less than about 50 mm, less than about 55 mm, less than about 60 mm, and/or combinations or ranges thereof. The overall length 148 of the planar portion 104 may be at least about 20 mm, at least about 25 mm, at least about 30 mm, at least about 35 mm, at least about 40 mm, less than about 45 mm, less than about 50 mm, less than about 55 mm, less than about 60 mm, and/or combinations or ranges thereof. An overall length 176 of the coupling portion 52 may be at least about 30 mm, at least about 40 mm, at least about 50 mm, at least about 60 mm, less than about 70 mm, less than about 80 mm, less than about 90 mm, less than about 100 mm, and/or combinations or ranges thereof (including intermediate values). The sloped portion 100 may extend the entire length of the coupling portion 52. For example, the sloped portion 100 may extend from the top surface 84 of the storage tray 48 in a downward sloping direction to the end of the planar portion 104. The angle 144 of the sloped portion 100 is measured from the top surface 84 of the storage tray 48. The angle 144 may be at least about 16.50 degrees, at least about 16.55 degrees, at least about 16.60 degrees, at least about 16.65 degrees, at least about 16.70 degrees, at least about 16.75 degrees, at least about 16.80 degrees, at least about 16.85 degrees, at least about 16.90 degrees, at least about 16.95 degrees, less than about 17.00 degrees, less than about 17.05 degrees, less than about 17.10 degrees, less than about 17.15 degrees, less than about 17.20 degrees, and/or combinations or ranges thereof (including intermediate values).

Figure 12:
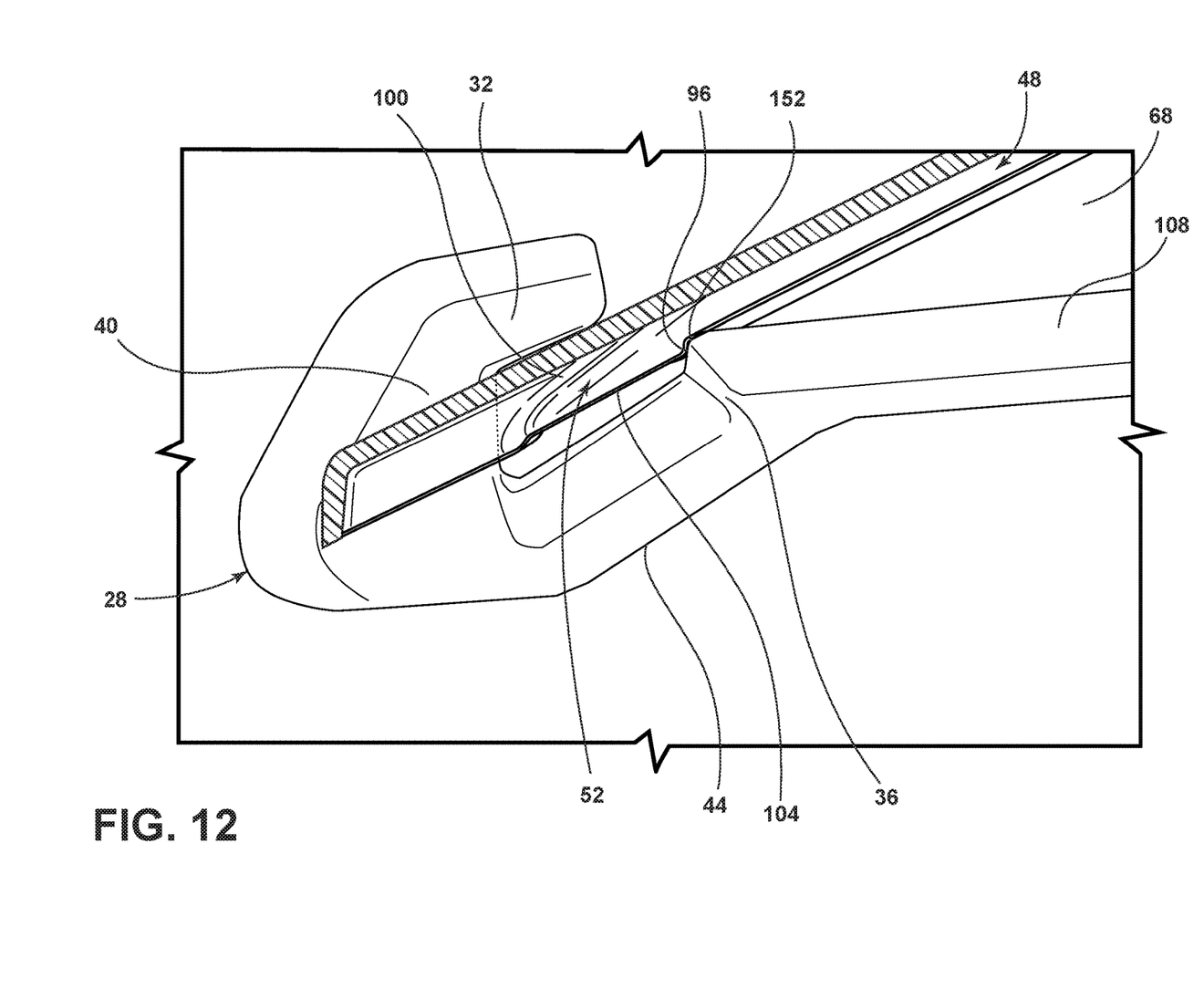
FIG. 12 is a cross-sectional view of the storage tray engaged with the retention structure, taken along line II-II of FIG. 1, according to the second embodiment.

Referring to FIG. 12, the engagement between the storage tray 48 and the retention structure 28 is shown according to the embodiments depicted in FIGS. 8-11. The engagement of the coupling portion 52 of the storage tray 48 may be achieved by placing the storage tray 48 on the horizontal portion 108 of the retention structure 28 and sliding the storage tray 48 toward the vertical portion 36. Next, the coupling portion 52 may drop into the retention structure 28 such that the recessed portion 96 of the coupling portion 52 engages with the vertical portion 36 and/or the first transitional arc 152, thereby retaining the storage tray 48 during vehicle maneuvers. Alternatively, the storage tray 48 may be manipulated in a manner that is similar to that described above for the alternative embodiment depicted in FIG. 3. That is, the storage tray 48 may be installed to or removed from the retention structure 28 by placing the storage tray 48 at an angle, as shown, and engaging the coupling portion 52 with the retention structure 28. Then, the storage tray 48 may be rotated downward to rest upon the horizontal portion 108 while being retained in forward, reward, and vertical directions by the coupling portion 52 interacting with the retention structure 28. Alternatively, the storage tray 48 may be removed from the retention structure 28 by lifting and/or pulling the storage tray 48 toward the rear of the vehicle 20 (FIG. 1). The coupling portion 52 includes the recessed portion 96, the sloped portion 100, and the planar portion 104. The retention structure 28 includes the upper portion 32, the vertical portion 36, the arcuate portion 40, and the angled portion 44. The upper portion 32 is adjacent to the arcuate portion 40. The angled portion 44 is adjacent to the arcuate portion 40 and opposite the upper portion 32. The vertical portion 36 is adjacent to the angled portion 44 and is opposite the arcuate portion 40. The retention structure 28 may be formed as a separate piece that is coupled to the trim panel 68 during assembly by the manufacturer or as an add-on piece installed by a dealer or end-user. Alternatively, the retention structure 28 may be integrally formed with the trim panel 68.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle cargo area, comprising:
   a retention structure having an upper portion, a vertical portion, an arcuate portion, and an angled portion; and
   a storage tray having a coupling portion that removably couples to the retention structure by passing over the vertical portion and engages with the vertical portion such that the coupling portion is secured in the retention structure.

2. The vehicle cargo area of claim 1, wherein the retention structure further comprises:
   a horizontal portion.

3. The vehicle cargo area of claim 2, wherein the vertical portion extends in a downward direction relative to the horizontal portion.

4. The vehicle cargo area of claim 3, wherein the angled portion extends in a downward sloping direction from the vertical portion.

5. The vehicle cargo area of claim 4, wherein the arcuate portion extends in an upward direction from the angled portion.

6. The vehicle cargo area of claim 5, wherein the upper portion extends in an upward sloping direction from the arcuate portion, and wherein the upper portion is substantially parallel to the angled portion.

7. The vehicle cargo area of claim 6, wherein a height difference between the horizontal portion and an upper extreme of the upper portion is about equal to a height of the vertical portion.

8. The vehicle cargo area of claim 1, wherein the storage tray couples to the retention structure such that unintentional decoupling of the storage tray is prevented in forward, rearward, and vertical directions.

* * * * *